INVENTOR.
RICHARD H. FISH
BY
Hansen and Paul
ATTORNEYS.

Sept. 12, 1967  R. H. FISH  3,341,126
ADJUSTABLE AGRICULTURAL SPRAY MECHANISM
Filed Nov. 30, 1965  2 Sheets-Sheet 2

INVENTOR.
RICHARD H. FISH
BY
ATTORNEYS.

United States Patent Office 3,341,126
Patented Sept. 12, 1967

3,341,126
ADJUSTABLE AGRICULTURAL SPRAY
MECHANISM
Richard H. Fish, P.O. Box 337,
Morgan Hill, Calif. 95037
Filed Nov. 30, 1965, Ser. No. 510,640
8 Claims. (Cl. 239—78)

The present invention relates to an agricultural spray mechanism, and pertains more particularly to a mechanism wherein insecticidal or other spray liquid is discharged by centrifugal force through a perforated wall bowl mounted axially of the fan, and the fan is mounted for rotative adjustment about an axis perpendicular to its flow axis.

In my Patent No. 3,092,327, issued June 4, 1963, there is disclosed a sprayer of the same general type as that of the present invention, which is directed to improvements which broaden the field of use, and improve the operation of this type of spray mechanism.

In its illustrative form, the present invention provides a pair of axial flow fans mounted for rocking movement about an axis extending longitudinally of a vehicle upon which the fans are mounted, a friction plate being provided on each fan and connected by clamp means to a power driven rocking member. Upon loosening either of the clamp means, the associated fan is thereby freed for rotative adjustment about its rocking axis, and is reclamped in such rotatively adjusted position by again tightening the clamp means.

A perforated wall bowl structure is provided co-axially of each fan comprising a skeleton frame structure and an easily removable perforated sleeve mounted co-axially therein. A low pressure liquid insecticide feed line is mounted with a removable end portion thereof directed co-axially into each perforated sleeve, so that by removing the end portion of the feed pipe, the perforated sleeve is easily removable for cleaning or for replacement by a sleeve having different sizes of perforations therein.

An object of the invention is to provide an improved orchard spray mechanism employing an axial flow fan with an improved perforated bowl structure co-axially thereof.

Another object of the invention is to provide an orchard spray mechanism having a pair of axial flow fans mounted on a vehicle for rocking movement about an axis extending longitudinally of the vehicle, means being provided to rotatively adjust either or both of the fans about the rocking axis.

Another object of the invention is to provide an improved orchard spray mechanism employing a pair of axial flow fans mounted for power driven rocking movement about an axis extending longitudinally of a vehicle upon which the fans are mounted, each of the fans having a perforated wall bowl structure co-axially thereof and having a low pressure liquid supply line mounted with a terminal portion thereof extending co-axially into each of the bowls.

The foregoing objects and advantages of the invention will be apparent from the following description and the accompanying drawings, wherein.

Figure 1:
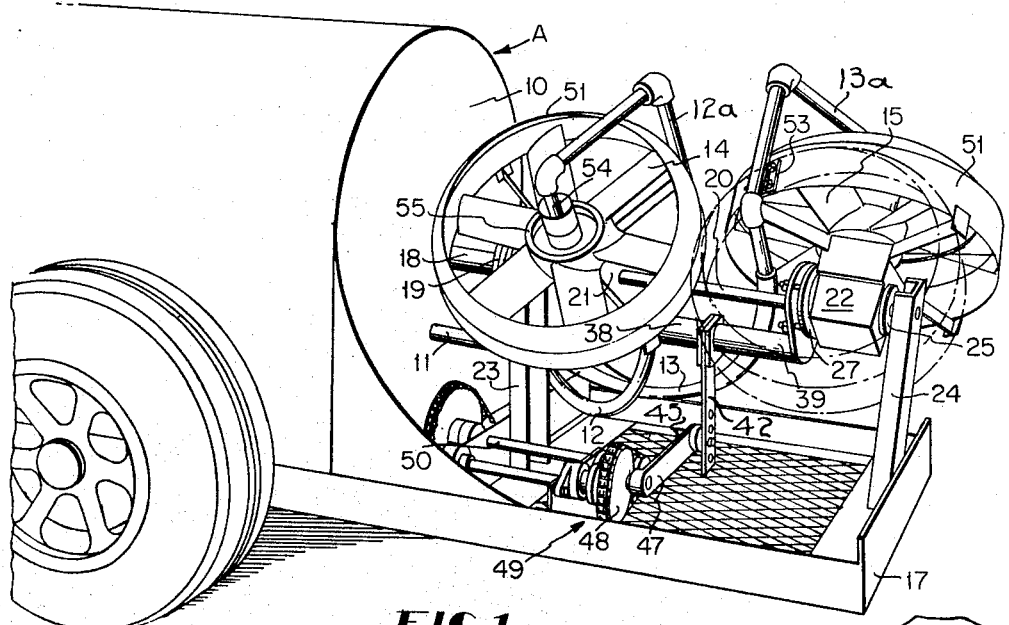
FIG. 1 is a perspective view of a spray mechanism embodying the invention, one of the fans being shown in rotatively adjusted position about its rocking axis in dash-dot lines.

Referring to the drawings in detail, a vehicle A may be a tank-type trailer of a type frequently employed for supplying liquid insecticide or other liquid to an agricultural spray mechanism. Power drive mechanisms, such as an industrial type internal combustion engine of suitable horsepower (not shown), is mounted on the forward end of the vehicle A in a conventional manner, and drives a conventional liquid pump (also not shown) for supplying liquid from the vehicle tank 10 through a pipe 11 (FIG. 1), hoses 12 and 13, and pipes 12a and 13a, to a pair of axial flow fans 14 and 15 mounted on a platform 17 extending rearwardly from the tank 10 of the vehicle A.

A drive shaft 18, driven by the engine, extends in a usual sealed tube through the tank 10 and is connected by a coupling 19 (FIG. 1) to a drive shaft 20 which extends through two similar fan drive gear boxes 21 and 22.

Within each of the gear boxes 21 and 22 conventional bevel gearing is provided so that powered rotation of the shaft 20 drives the two fans 14 and 15 about their respective axes. Since such gear box mechanism is conventional and well known, and since the structure thereof is not a feature of the present invention, it is not necessary to illustrate or describe it herein.

A pair of fan support standards 23 and 24 are provided, one at each end of the platform 17, and a bearing 25 (FIG. 4) is mounted on the upper end of each thereof for rocking support of the outer ends of the gear boxes 21 and 22.

Figure 2:
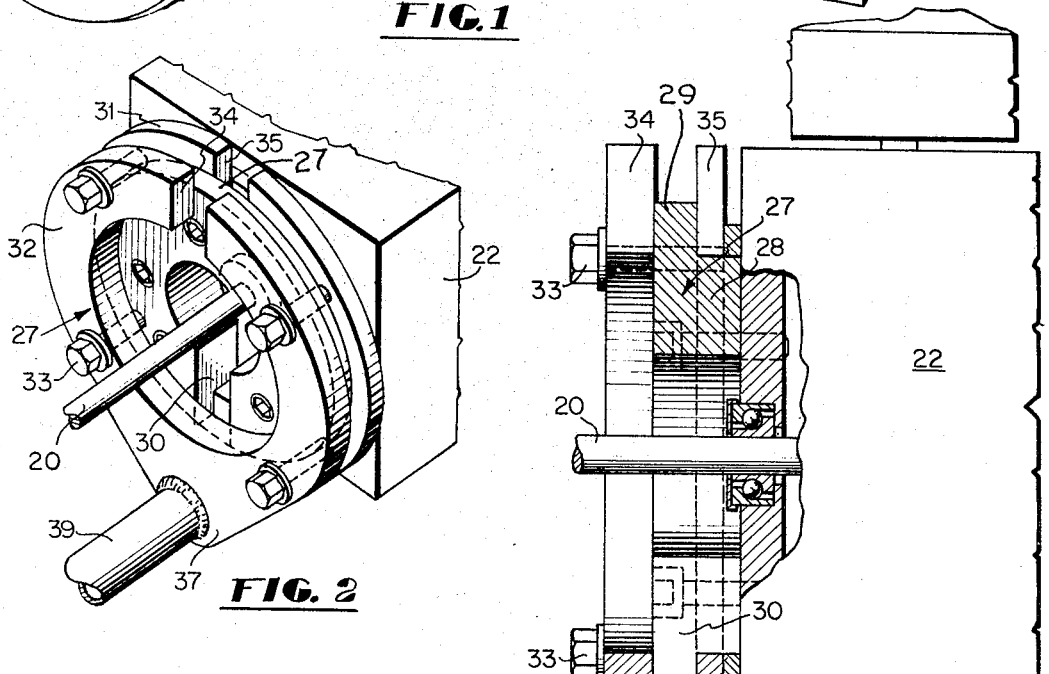
FIG. 2 is an enlarged, fragmentary, perspective view showing one of the structures which provide for rotative adjustment of the fans about their rocking axis.
Figure 3:
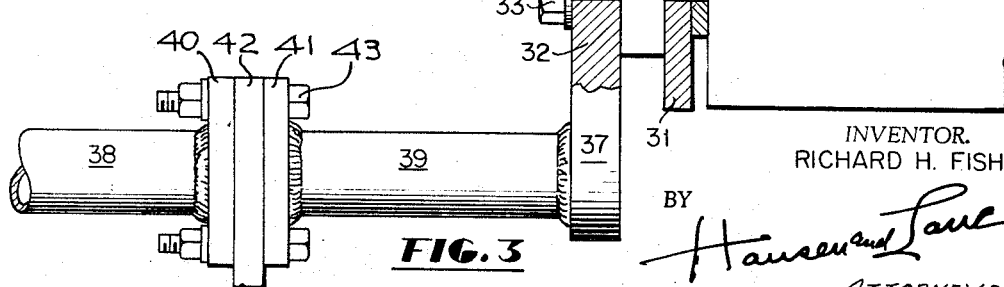
FIG. 3 is a further enlarged, side elevational view of the fragment shown in FIG. 2, portions being broken away.

Mounted co-axially of the inner end of each of the gear boxes is a frictional clutch member 27 having a circular base portion 28 and an annular, radially extending flange 29 around its inward or free end. This friction clutch member 27 has a radial gap 30 (FIGS. 2 and 4) therein of a width slightly greater than the diameter of the fan drive 20 to permit the clutch member 27 to be mounted on or removed from the gear box while the shaft 20 is in place.

For frictionally engaging the flange 29, a pair of clamp rings 31 and 32 are mounted one on each side of the flange 29, and are interconnected by a plurality of screws 33 which are located radially outwardly beyond the flange 29. The inner and outer clamp rings 31 and 32 are provided with radial gaps 34 and 35, respectively (FIG. 2), similar to the gap 30 in the clutch member 27 and for the same purpose.

When the screws 33 are loosened, the flange 29 is freed to permit rotative adjustment of the associated gear box and its fan, but when these screws are drawn down tight to frictionally grip the flange 29 between the rings 31 and 32, the associated gear box is locked firmly against rotative movement relative to the clamp rings 31 and 32.

A downwardly extending portion 37 is provided on each of the clamp rings 32, and a pair of axially aligned tubular portions 38 and 39 (FIGS. 1 and 4) are secured, as by welding, one to each of the portions 37.

Clamp plates 40 and 41 are provided on the inward ends of the tubular portions 38 and 39, and the upper end portion of a rocking arm 42 is clamped between these two plates by bolts 43 with the tubular portions 38 and 39 co-axially aligned and parallel to the fan drive shaft 20.

The rocking arm 42 has a plurality of holes 44 therein (FIG. 4) at different distances from the common axis of the tubular portions 38 and 39, and a stud 45, mounted on one end of a pitman 47, is fitted into a selected one of these holes. The other end of the pitman 47 is pivotally connected eccentrically to a sprocket 48, which is driven through a sprocket and chain mechanism 49 (FIG. 1) from a drive shaft 50 which extends rearwardly beneath the tank 10 and is driven at its forward end by suitable gearing (not shown), from the power drive means mentioned previously herein.

Figure 4:
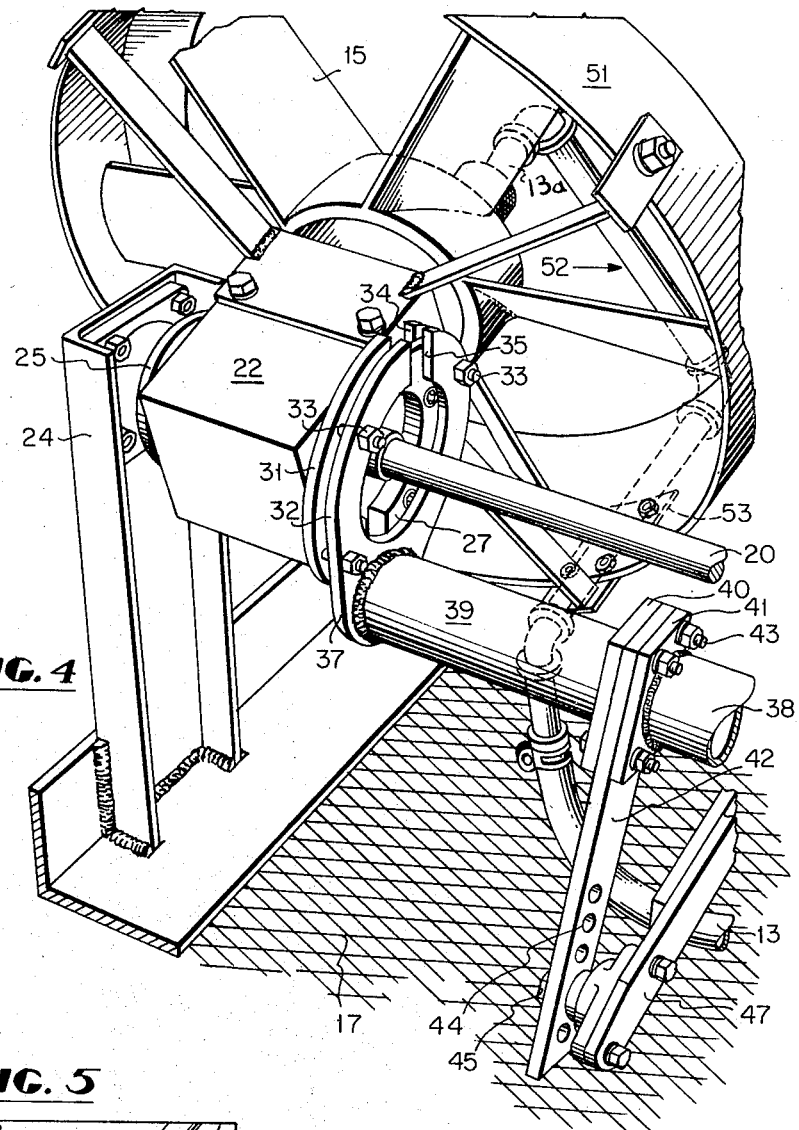
FIG. 4 is a fragmentary perspective view of the rear fan and its mounting structure, including its rotatively adjustable connection to the rocking mechanism.

The axial flow fans 14 and 15 are surrounded by shrouds 51 similar to those disclosed in my Patent No. 3,092,327 mentioned previously herein, and the pipe assemblies 12a and 13a are mounted by brackets 53, best shown in FIG. 4, on a side of each of the shrouds. A portion of each pipe assembly extends radially inwardly over the discharge side of each fan, and has a removable, axially directed end portion 54 extending into a perforated wall bowl 55 mounted co-axially of the discharge side of each of the fans. Control of the flow rate of insecticide or other liquid through the pipe end portions 54 is provided by a plug 62 screwed into the intake end of each pipe portion 54, and having an orifice 63 of known size therein. By feeding the liquid from the tank 10 through the hose 12 and 13 at a selected, known pressure, the flow rate to the fans can be accurately controlled by the size of the orifice. Also, this pipe end portion can be easily and quickly removed for checking and cleaning by unscrewing the pipe end portions 54 as shown in FIG. 5.

Figure 5:
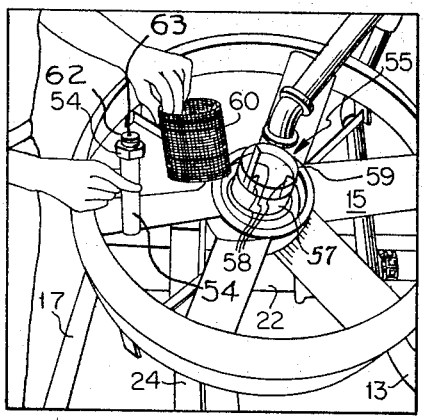
FIG. 5 is a small scale perspective view showing the discharge side of one of the fans with a terminal portion of the liquid supply line, and the cylindrical, perforated wall of the liquid discharge bowl removed therefrom.

As best shown in FIG. 5, the bowl structure comprises a shallow depression 57 co-axially of the upper or discharge side of each fan, with three symmetrically arranged, upwardly extending metal strips or vanes 58 peripherally therein, each vane being disposed along a radial plane from the fan axis. A wire retaining ring 59 is mounted around the upper end of these blades to support them and to assist in frictionally engaging a perforated cylindrical sleeve 60, which fits down over this wire ring and with its lower end fitted into the depression 57. These blades cause the liquid in the bowl to rotate with the fan, and thus increase the centrifugal force on the liquid, tending to force it through the perforations in the sleeve 60. This structure also permits easy and rapid removal of the perforated sleeves 60, as shown in FIG. 5 for cleaning, or for replacement by sleeves with different sizes of perforations therein as required.

The operation of the illustrated form of the invention is as follows: With the fans 14 and 15 clamped by their clamp rings 31 and 32 in rotatively adjusted position to their respective gear boxes, upon operation of the power drive means (not shown) the fan shaft 18 is driven, and thereby the fans 14 and 15 are rapidly rotated. Liquid is pumped at regulated pressure through the hoses 12 and 13 and the pipe assemblies 12a and 13a for bleeding at a controlled rate through the orifice 63 and thence for centrifugal discharge through the perforated sleeves 60 into the air blasts from the fans. At the same time the fans are oscillated back and forth by means of the pitman 47, the rocking arm 42 and the cam and sprocket drive mechanism 49.

For changing the direction of the air blasts from either or both of the fans, the mechanism is stopped and the screws 33 interconnecting the clamp rings 31 and 32 of the fan or fans to be adjusted are loosened to free the friction flange 29 therebetween. When the friction flange 29 of a selected gear box is thus released, the selected gear box 21 or 22 may then be swung about the fan shaft 20 and bearings 25 as an axis to a desired, newly adjusted position, for example, between the solid line position of the rear fan in FIG. 1 and its broken line position therein. The screws 33 are then again tightened to clamp the flange 29 between its rings 31 and 32 and thereby securely anchor the selected gear box and the fan mounted thereon in their newly adjusted position, whereupon the mechanism is again ready for use as described previously herein.

For changing the perforated cylindrical sleeves 60 it is merely necessary to remove the terminal pipe portions 54 and withdraw the sleeves 60 axially from their respective vanes 58 and retaining ring 59, after which the same or another sleeve 60 may be inserted by reversing the foregoing procedure. With the terminal pipe portions 54 removed it is also a simple matter to vary the flow rate of liquid from the tank 10 into the bowls 55 by replacing the orifice plugs 62 with plugs with larger or smaller orifices as desired.

The invention provides adjusting and control mechanism which simplifies and improves the spray mechanism of my prior Patent No. 3,092,327, at a negligible increase in cost.

While I have illustrated and described a preferred embodiment of the present invention it will be understood, however, that various changes and modifications may be made in the details thereof without departing from the scope of the invention as set forth in the appended claims.

I claim:

1. In an orchard spray mechanism wherein a supporting vehicle for travel along a path between rows of trees in an orchard has a fan support mounted thereon with a power driven fan drive shaft extending through the fan support longitudinally of the supporting vehicle;
   - a pair of fan drive gear boxes journaled for separate rotative adjustment about the axis of the fan drive shaft,
   - an axial flow fan mounted on each gear box in driven relation with the fan drive shaft and with its flow axis perpendicular to the axis of the fan drive shaft,
   - a yoke extending between the fan gear boxes,
   - power transmission means operatively connected to rock the yoke back and forth upon rotation of the fan drive shaft,
   - clutch means releasably securing each end of the yoke to one of the gear boxes in selected rotatively adjusted position of the gear box about the axis of the fan drive shaft, and
   - power drive means for rotatively driving the fan drive shaft and thereby the fans at high speed to create an axially directed air blast by each fan while simultaneously rocking the yoke and thereby the gear boxes in their individually adjusted positions back and forth about the axis of the fan drive shaft.

2. In an orchard spray mechanism as claimed in claim 1, a rocking yoke and clutch structure wherein an annular flange is secured to each gear box, a pair of clamp rings is provided for each end of the yoke, the clamp rings of each pair thereof having aligned gaps therein of a size to pass the fan drive shaft therethrough, one clamp ring of each pair thereof being secured to each end of the yoke, each pair of clamp rings being of a size to receive one of the flanges substantially co-axially therebetween, and means for drawing the clamp rings of each pair thereof together into clamping relation with a flange mounted co-axially, in rotatively adjusted position therebetween.

3. In an orchard spray mechanism as claimed in claim 2, the means for drawing the clamp rings of each pair thereof together comprising a plurality of screws distributed at selected circumferential distances around, and spaced radially slightly from an associated flange located co-axially between the clamp rings.

4. In an orchard spray mechanism, a rocking yoke and clutch structure as claimed in claim 2, each clamp ring comprising an annular base portion and a radially projecting, substantially integral, co-axial circular flange portion around the upper end of the base portion, the base and flange portions having a gap therein of a width to pass the fan drive shaft therethrough.

5. In an orchard spray mechanism, wherein a supporting vehicle for travel along a path between rows of trees in an orchard has a fan support mounted thereon with a power driven fan drive shaft extending through the fan support longitudinally of the supporting vehicle;

a pair of fan drive gear boxes journaled for separate rotative adjustment about the axis of the fan drive shaft, an axial flow fan mounted on each gear box in driven relation with the fan drive shaft and with its flow axis perpendicular to the axis of the fan drive shaft, a perforated wall bowl-shaped membed mounted co-axially on the discharge side of each fan for rotation therewith, an insecticide liquid supply pipe mounted with the discharge end thereof directed into the open side of each bowl-shaped member, means for supplying liquid insecticide at low pressure to each liquid supply pipe for discharge into the bowl-like member while the fan and bowl-like member are being rotated at high speed by the fan drive shaft in a direction to discharge a high velocity air blast axially outwardly from the discharge side of each fan, a yoke extending between the fan gear boxes, power transmission means operatively connected to rock the yoke back and forth upon rotation of the fan drive shaft, clutch means releasably securing each end of the yoke to one of the gear boxes in selected rotatably adjusted position of the gear box about the axis of the fan drive shaft, and power drive means for rotatively driving the fan shaft and thereby the fans at high speed to create an axially directed outward air blast by each fan, and simultaneously rocking the yoke and thereby the gear boxes in their individually adjusted positions back and forth about the axis of the fan drive shaft.

6. In an orchard spray mechanism as claimed in claim 5, a plurality of radially directed vanes disposed in symmetrically spaced relation around the interior of the perforated wall of each bowl-shaped member, the perforated wall of each bowl-shaped member being an individually removable, cylindrical sleeve fitted closely around the vanes.

7. In an orchard spray mechanism as claimed in claim 6, a wire ring fitted around the outer ends of the vanes co-axially of each fan and of a size to fit snugly into each perforated sleeve.

8. In an orchard spray mechanism as claimed in claim 5, means for supplying liquid at low pressure to each supply pipe wherein a plug having an orifice of a selected size therein is fitted therein, and the liquid is forced at a regulated pressure through such orifice, each liquid supply pipe beyond the orifice being at atmospheric pressure.

References Cited

UNITED STATES PATENTS 3,092,327 6/1963 Fish ---------------- 239—77

EVERETT W. KIRBY, *Primary Examiner.*